United States Patent
Lee et al.

(10) Patent No.: US 12,515,754 B2
(45) Date of Patent: Jan. 6, 2026

(54) BICYCLE CYCLING SAFETY WARNING SYSTEM

(71) Applicant: EISO ENTERPRISE CO., LTD., Taoyuan (TW)

(72) Inventors: Yi-Hsiung Lee, Taoyuan (TW); Hung-Ching Tu, Taoyuan (TW)

(73) Assignee: EISO ENTERPRISE CO., LTD., Taoyuan (TW)

( * ) Notice: Subject to any disclaimer, the term of this patent is extended or adjusted under 35 U.S.C. 154(b) by 15 days.

(21) Appl. No.: 18/663,346

(22) Filed: May 14, 2024

(65) Prior Publication Data

US 2025/0353560 A1    Nov. 20, 2025

(51) Int. Cl.
*B62J 6/24* (2020.01)
*B62J 45/41* (2020.01)

(52) U.S. Cl.
CPC ...... *B62J 6/24* (2020.02); *B62J 45/41* (2020.02)

(58) Field of Classification Search
CPC .............. B62J 6/24; B62J 45/41; B62J 6/22
See application file for complete search history.

(56) References Cited

U.S. PATENT DOCUMENTS

| | | | | |
|---|---|---|---|---|
| 6,731,202 B1 * | 5/2004 | Klaus | ............... | B60Q 9/008 340/901 |
| 8,325,027 B2 * | 12/2012 | Tee | ............... | B62J 6/01 353/11 |
| 9,656,602 B2 * | 5/2017 | Needham | ............... | B62J 6/04 |
| 10,392,068 B2 * | 8/2019 | Ebrahemi | ............... | B62K 19/40 |
| 10,393,365 B2 * | 8/2019 | Frankovich | ............... | H05B 45/10 |
| 11,113,972 B2 * | 9/2021 | Clyne | ............... | G08G 1/166 |
| 11,486,725 B2 * | 11/2022 | Cun | ............... | B62K 3/002 |
| 11,584,292 B1 * | 2/2023 | Lin | ............... | B62K 21/26 |
| 12,319,197 B2 * | 6/2025 | Shibata | ............... | B60Q 1/50 |
| 12,327,474 B1 * | 6/2025 | Dammers | ............... | G08G 1/04 |
| 2008/0219014 A1 * | 9/2008 | Loibl | ............... | B62J 23/00 362/473 |
| 2010/0225459 A1 * | 9/2010 | Lee | ............... | B60Q 1/50 340/432 |

(Continued)

FOREIGN PATENT DOCUMENTS

CN    107839797    3/2018

*Primary Examiner* — Curtis J King
(74) *Attorney, Agent, or Firm* — MUNCY, GEISSLER, OLDS & LOWE, P.C.

(57) ABSTRACT

A bicycle cycling safety warning system includes an oncoming vehicle sensing unit, a direction prompting unit, a projection warning unit, and a control unit. The oncoming vehicle sensing unit is provided with an oncoming signal upon activating, and the oncoming vehicle sensing unit includes a positional relationship between the bicycle and an adjacent vehicle and a speed of the adjacent vehicle. The projection warning unit includes at least two projection lamps, and each of the at least two projection lamps generates a projection image around the bicycle when activated. The control unit is connected to the oncoming vehicle sensing unit, the direction prompting unit, and the projection warning unit. The control unit controls the projection warning unit based on the oncoming vehicle signal, the control unit may also control the projection warning unit based on the oncoming vehicle signal and the direction prompting unit.

4 Claims, 8 Drawing Sheets

(56) References Cited

U.S. PATENT DOCUMENTS

| | | | | |
|---|---|---|---|---|
| 2010/0283590 | A1* | 11/2010 | Tee | B62J 6/01 340/432 |
| 2012/0112635 | A1* | 5/2012 | Cho | B62J 6/26 315/77 |
| 2014/0203923 | A1* | 7/2014 | Lai | G01C 21/365 340/432 |
| 2016/0104380 | A1* | 4/2016 | Maiolani | G01S 19/13 340/432 |
| 2016/0221625 | A1* | 8/2016 | Slaughter | B62J 6/028 |
| 2016/0330417 | A1* | 11/2016 | Lin | B62J 50/22 |
| 2018/0079463 | A1* | 3/2018 | Pearce | B62J 45/412 |
| 2019/0002052 | A1* | 1/2019 | Chen | B62J 6/015 |
| 2021/0315289 | A1* | 10/2021 | Watson | B60Q 1/381 |
| 2021/0362796 | A1* | 11/2021 | Dallas | B62J 11/00 |
| 2022/0126942 | A1* | 4/2022 | Latt | B62J 6/26 |
| 2024/0065349 | A1* | 2/2024 | Watson | F21S 43/15 |
| 2024/0185717 | A1* | 6/2024 | Wendt | B62J 11/04 |
| 2024/0239365 | A1* | 7/2024 | Banerjee | E05F 15/40 |
| 2024/0253721 | A1* | 8/2024 | Ko | B62J 6/04 |
| 2024/0367742 | A1* | 11/2024 | Sanz Espinosa | B60Q 1/50 |
| 2024/0416756 | A1* | 12/2024 | Wendt | B60L 50/20 |

* cited by examiner

BICYCLE CYCLING SAFETY WARNING SYSTEM

FIELD OF THE INVENTION

The invention relates to a bicycle cycling safety warning system.

BACKGROUND OF THE INVENTION

CN107839797A discloses a bicycle safety zone system, which includes one or more devices with both projection and sensing and a processing unit. The device with projection and sensing can detect vehicles near the bicycle, and can project at least part of a visual safety zone on the ground around the bicycle. The processing unit communicates with the device with projection and sensing. When the device with projection and sensing detects a vehicle located in the vicinity of the bicycle, the processing unit generates an alarm perceivable by a user of the bicycle, and the device with projection and sensing changes a visual appearance of the visual safety zone.

Although the visual appearance of the visual safety zone can be changed, changes in the visual safety zone do not take into account statuses of oncoming vehicles, so the user cannot clearly understand the statues of the oncoming vehicles. The foregoing implementation can actually only provide a reminder when the vehicles are coming, but without linking with other light signaling devices on the bicycle (such as direction lights).

SUMMARY OF THE INVENTION

A main object of the invention is to solve the problem of conventional technical solution.

In order to achieve the above object, the invention provides a bicycle cycling safety warning system configured on a bicycle. The bicycle cycling safety warning system includes an oncoming vehicle sensing unit, a direction prompting unit, a projection warning unit, and a control unit. The oncoming vehicle sensing unit is configured on the bicycle and provided with an oncoming signal upon activating, and the oncoming vehicle sensing unit includes a positional relationship between the bicycle and an adjacent vehicle, and a speed of the adjacent vehicle. The direction prompting unit is configured on the bicycle and controlled to generate a direction light signal. The projection warning unit includes at least two projection lamps facing different positions, and each of the at least two projection lamps is configured to generate a projection image around the bicycle when activated. The control unit is connected to the oncoming vehicle sensing unit, the direction prompting unit, and the projection warning unit. The control unit operates in a first state for controlling the projection warning unit based on the oncoming vehicle signal, and a second state for controlling the projection warning unit based on the oncoming vehicle signal and the direction prompting unit, wherein the control unit determines whether the speed of the adjacent vehicle of the oncoming vehicle signal reaches a speed condition in the first state, and the control unit issues a warning when the speed condition is reached.

In one embodiment, the control unit determines warning modes of the projection warning unit based on the speed of the adjacent vehicle sensed in the oncoming vehicle signal.

In one embodiment, the bicycle cycling safety warning system includes a wireless communication unit connected to the control unit.

In one embodiment, the control unit is in information connection to the controller for controlling the direction prompting unit.

In one embodiment, the oncoming vehicle sensing unit includes a plurality of radar components, and the control unit determines to activate at least one of the plurality of the radar components based on controlling the direction prompting unit by the controller.

In one embodiment, the bicycle cycling safety warning system includes a front supplement light unit connected to the control unit, and the front supplement light unit supplements light in a direction corresponding to a direction light control signal transmitted by the controller.

Through the foregoing implementation of the invention, compared with the prior art, the invention has the following characteristics: the bicycle cycling safety warning system of the present invention generates the projection image according to the speed of the adjacent vehicle, but also according to conditions of changing lanes or traveling positions of the bicycle. The invention provides the projection image warning the user of the bicycle to solve current accidents caused by the user looking back to check if the oncoming vehicle is approaching behind the bicycle, which can effectively reduce an occurrence of accidents such as being crashed by a vehicle approaching behind the bicycle, and greatly increase a safety of cycling. In addition to reminding the user of the oncoming vehicle status, the invention can also remind a driver of the adjacent vehicle to pay attention.

DETAILED DESCRIPTION OF THE PREFERRED EMBODIMENTS

The detailed description and technical content of the invention are described below with reference to the accompanying drawings.

Figure 1:
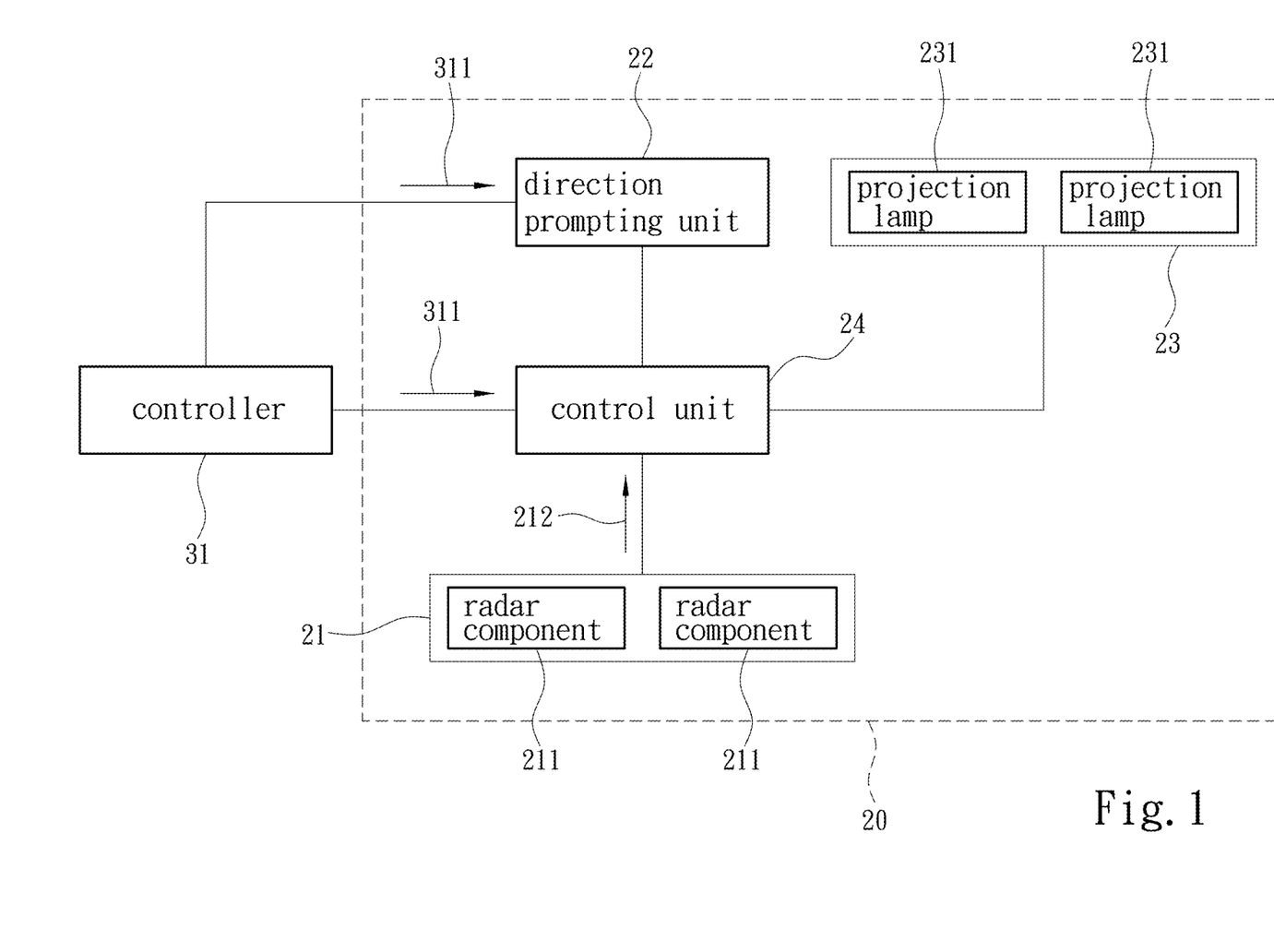
FIG. 1 is a system unit diagram (I) of an embodiment of the invention.
Figure 2:
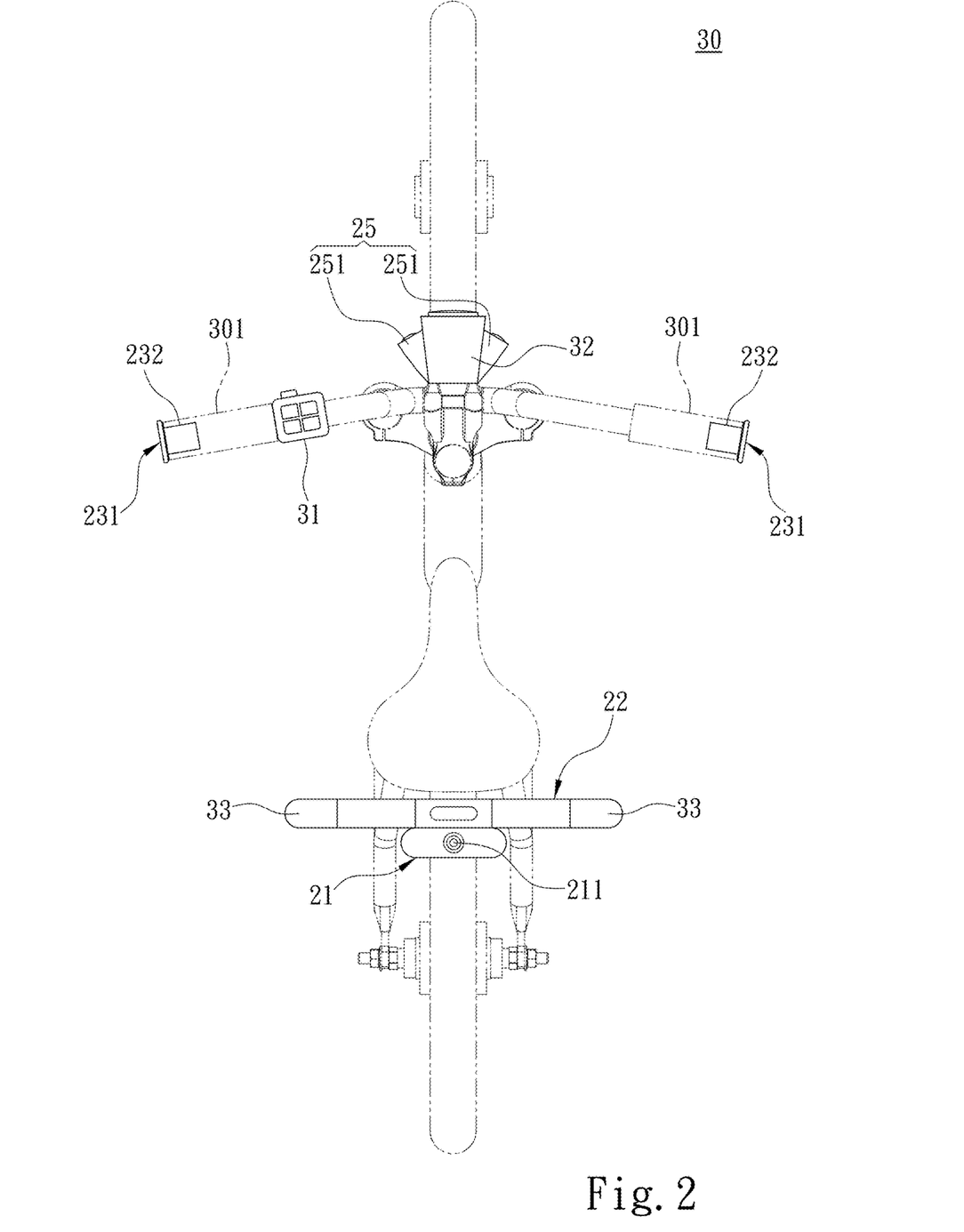
FIG. 2 is an implementation schematic diagram (I) of an embodiment of the invention.
Figure 3:
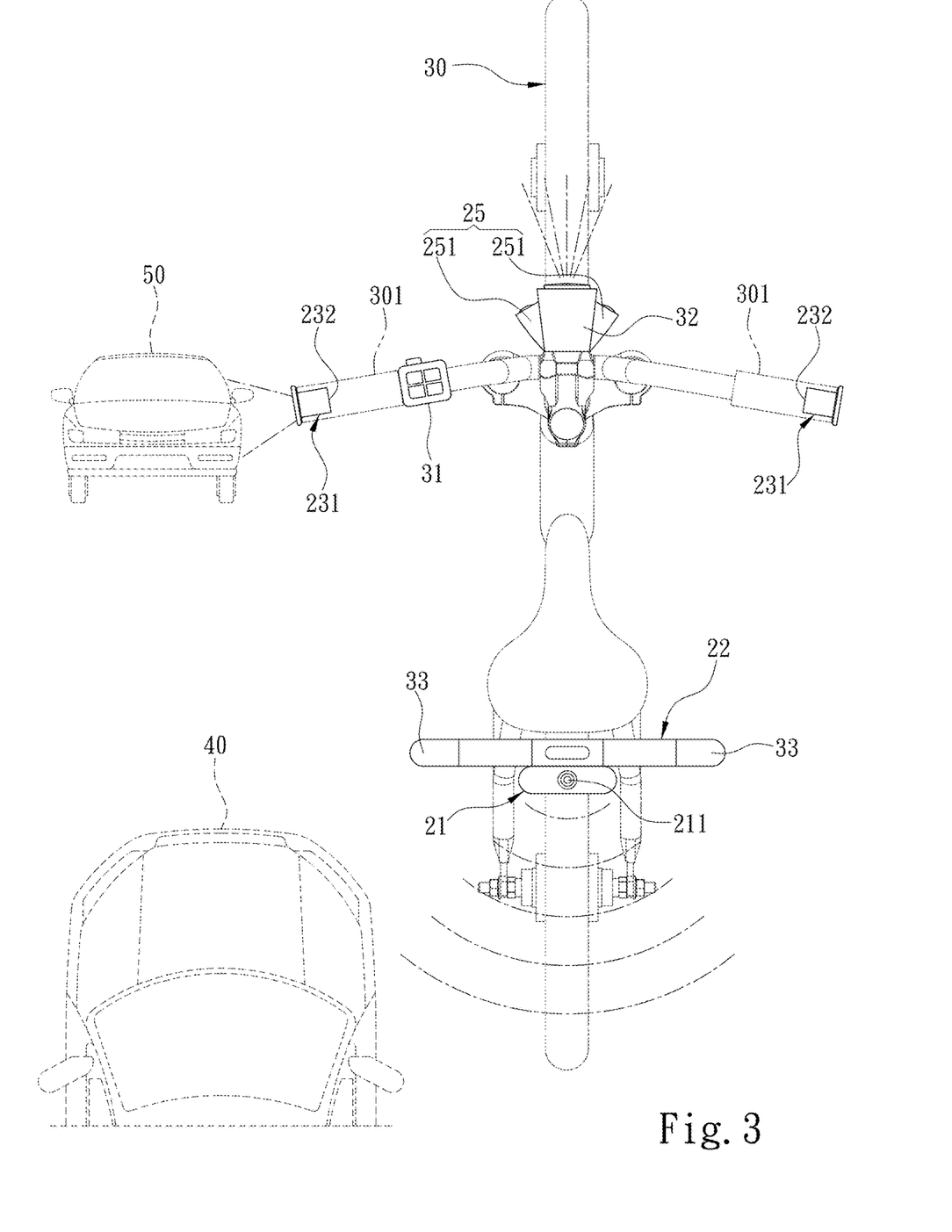
FIG. 3 is an implementation schematic diagram (II) of an embodiment of the invention.
Figure 4:
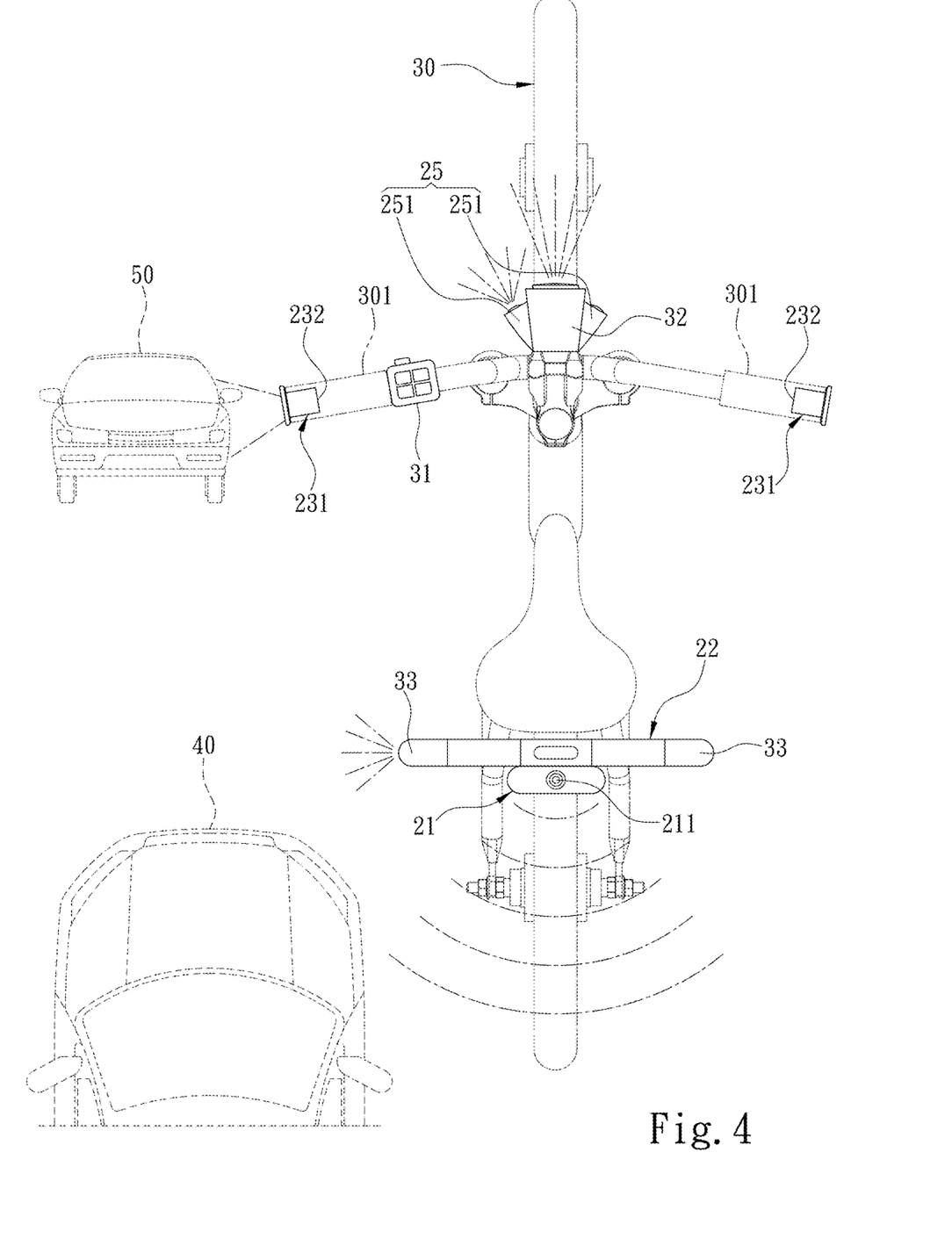
FIG. 4 is an implementation schematic diagram (III) of an embodiment of the invention.

Please refer to FIG. 1 and FIG. 2. The invention provides a bicycle cycling safety warning system 20 configured on a bicycle 30. The bicycle cycling safety warning system 20 includes an oncoming vehicle sensing unit 21, a direction prompting unit 22, a projection warning unit 23, and a control unit 24. In one embodiment, the oncoming vehicle sensing unit 21 is at least one radar component 211, an ultrasonic sensing device, and/or a photography module. The oncoming vehicle sensing unit 21 is configured on the bicycle 30, and the oncoming vehicle sensing unit 21 is located at a rear of the bicycle 30. The oncoming vehicle sensing unit 21 can be combined with a vehicle taillight or a direction light 33, or independently installed on a shelf of a rear wheel frame, but the invention is not limited thereto. When the oncoming vehicle sensing unit 21 is activated to sense whether an oncoming vehicle behind the bicycle 30, the oncoming vehicle sensing unit 21 is provided with an oncoming vehicle signal 212 upon activating. The oncoming vehicle signal 212 includes a positional relationship between the bicycle 30 and an adjacent vehicle 40 (as shown in FIGS. 3 and 4), and a speed of the adjacent vehicle 40. The positional relationship prompts whether the adjacent vehicle 40 (i.e., the oncoming vehicle behind the bicycle 30) approaches from the left or right side of the bicycle 30. The speed of the adjacent vehicle 40 is estimated by a computing program in a computing element included in the oncoming vehicle sensing unit 21, or estimated by the control unit 24 from data provided by the oncoming vehicle sensing unit 21.

Further, the direction prompting unit 22 is configured on the direction light 33 of the bicycle 30. The direction prompting unit 22 is controlled to generate a direction light signal by a controller 31, or an independent electronic device, or a bicycle computer, or a smartphone. In addition, the projection warning unit 23 includes at least two projection lamps 231 facing different positions, and the at least two projection lamps 231 are installed on the bicycle 30. The at least two projection lamps 231 are laser lamps or others that can produce obvious images on a ground. In one embodiment, the at least two projection lamps 231 are disposed on two handlebars 301 of the bicycle 30 In one embodiment, the at least two projection lamps 231 are assembled with handle plugs 232 disposed on the two handlebars 301. Each of the at least two projection lamps 231 generates a projection image 50 around the bicycle 30 when activated. The projection image 50 is not limited to a single one and can be adjusted according to implementation. Also, a brightness and a projection range of the projection image 50 can be adjusted according to a current environment. For example, during the day, the brightness of the projection image 50 increases, and the projection range of the projection image 50 becomes smaller. At night, the brightness of the projection image 50 gradually decreases, and the projection range of the projection image becomes larger. In addition, the control unit 24 is connected to the oncoming vehicle sensing unit 21, the direction prompting unit 22, and the projection warning unit 23. The control unit 24 can be integrated with the controller 31 as a single device, or implemented as a smartphone, or as an independent electronic device. In one embodiment, the control unit 24 is in information connection to the controller 31 to obtain signals for controlling the direction prompting unit 22.

The oncoming vehicle sensing unit 21, the direction prompting unit 22, the projection warning unit 23, and the control unit 24 of the invention communicate wirelessly or wiredly, and are not limited to all wireless connection or all wired connection. The aforementioned wireless communication can be ANT+ (Adaptive Network Topology+) wireless transmission protocol or Bluetooth wireless transmission protocol. The aforementioned wired communication can be CAN (Controller Area Network) wired communication protocol, and UART (Universal Asynchronous Receiver/Transmitter) wired communication protocol.

The control unit 24 of the invention operates in two states. In a first state, the control unit 24 controls the projection warning unit 23 based on the oncoming vehicle signal 212. In a second state, the control unit 24 controls the projection warning unit 23 based on the oncoming vehicle signal 212 and an operation of the direction prompting unit 22. An implementation environment of the control unit 24 in the first state is that the bicycle 30 is traveling and the oncoming vehicle approaches behind the bicycle 30, as shown in FIG. 3. The oncoming vehicle sensing unit 21 is activated to sense whether there is the oncoming vehicle approaching behind the bicycle 30. When the adjacent vehicle 40 enters a sensing range of the oncoming vehicle sensing unit 21, the oncoming vehicle sensing unit 21 senses the speed and the positions of the adjacent vehicle 40. The control unit 24 receives the oncoming vehicle signal 212 provided by the oncoming vehicle sensing unit 21 to control the projection warning unit 23 to generate the projection image 50 for assisting the user of the bicycle 30 in understanding a vehicle condition surrounded.

Figure 5:
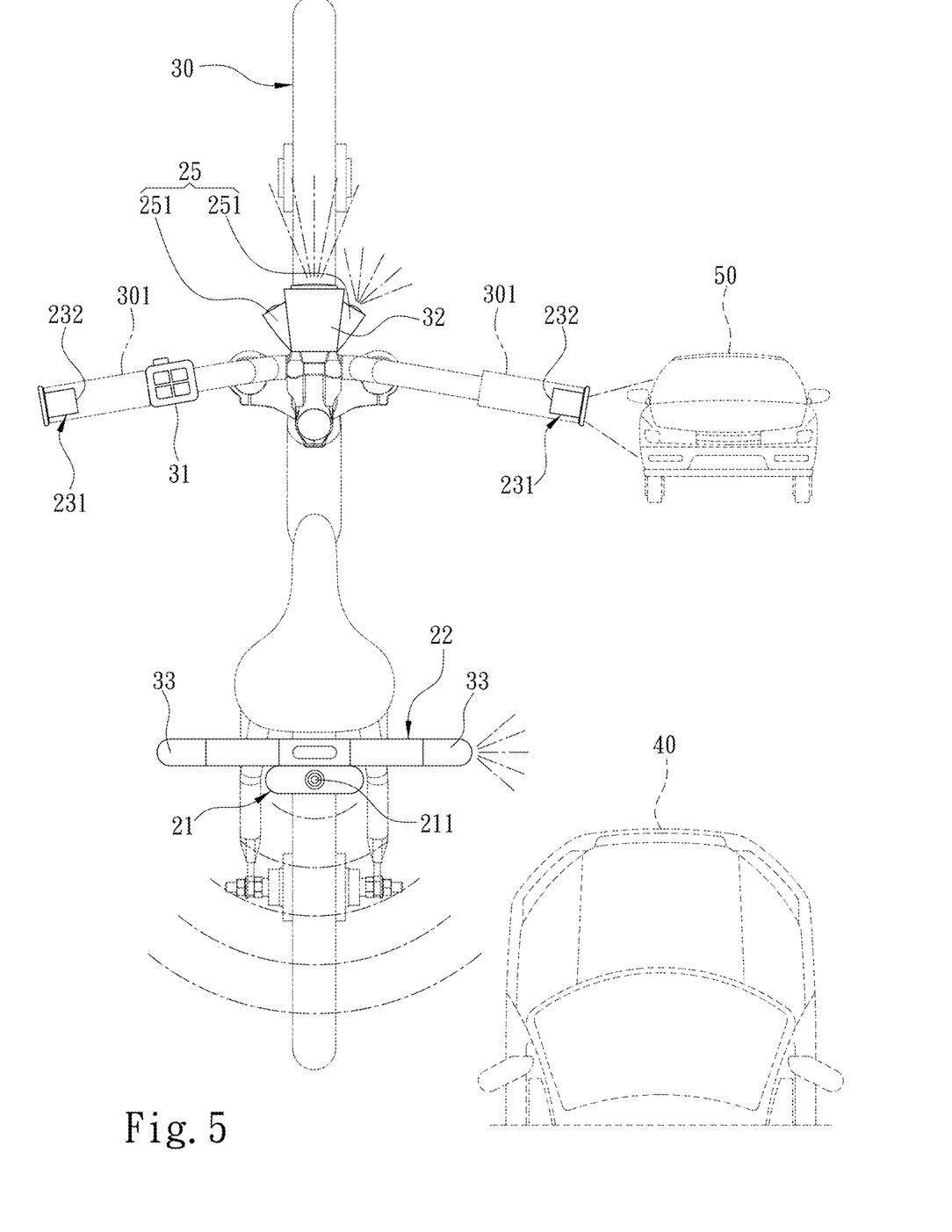
FIG. 5 is an implementation schematic diagram (IV) of an embodiment of the invention.

Further, in one embodiment, the control unit 24 determines the speed of the adjacent vehicle 40 sensed in the oncoming vehicle signal 212 based on a speed condition. In addition, the control unit 24 determines whether the adjacent vehicle 40 is approaching at a high speed in the first state, and the high speed referred to is based on the speed condition, and the adjacent vehicle 40 is considered to be at the high speed when an hourly speed exceeds the speed condition which can be set forty mph or fifty mph, but is not limited thereto. When the speed condition is reached, the control unit 24 controls the projection warning unit 23 to issue a warning, so that the user can know that a vehicle is approaching quickly from behind An implementation environment of the control unit 24 in the second state is when the bicycle 30 activates the direction prompting unit 22 while the bicycle 30 is traveling, and the oncoming vehicle approaches behind the bicycle 30, as shown in FIG. 4 and FIG. 5. After the oncoming vehicle sensing unit 21 is activated, the user of the bicycle 30 wants to change lanes or traveling position, thereby triggering the direction prompting unit 22 to generate the direction light signal. The oncoming vehicle sensing unit 21 senses the adjacent vehicle 40 approaching, and the control unit 24 controls the projection warning unit 23 to generate the projection image 50 based on a sensing result of the oncoming vehicle sensing unit 21 and the operation of the direction prompting unit 22, and the projection image 50 in the second state may be different from that in the first state.

The invention provides the projection image 50 warning the user of the bicycle 30 to solve current accidents caused by the user looking back to check if the oncoming vehicle is approaching behind the bicycle 30, which can effectively reduce an occurrence of accidents such as being crashed by a vehicle approaching behind the bicycle 30, and greatly increase a safety of cycling. In addition to reminding the user of the oncoming vehicle status, the invention can also remind a driver of the adjacent vehicle 40 to pay attention.

In one embodiment, the control unit 24 determines warning modes of the projection warning unit 23 based on the speed of the adjacent vehicle 40 sensed in the oncoming vehicle signal 212. For example, the control unit 24 determines a flicker frequency of the projection image 50 based on the speed of the adjacent vehicle 40. When the speed of the adjacent vehicle 40 is slower, the projection image 50 is presented with a slower flicker frequency. When the speed of the adjacent vehicle 40 is faster, the projection image 50 is presented with a faster flicker frequency. In addition to the flicker frequency, the brightness or image content of the projection image 50 can also be adjusted.

Please refer to FIG. 1, in one embodiment, the oncoming vehicle sensing unit 21 includes a plurality of radar components 211 respectively provided for sensing oncoming vehicles in different directions, wherein the different directions refer to the right side and the left side of the rear of the bicycle 30. When sensing ranges of the plurality of radar components 211 are overlapped, the oncoming vehicle sensing unit 21 performs weight analysis based on signals generated by the plurality of radar components 211 to determine positions of the adjacent vehicle 40. In one embodiment, the control unit 24 determines to activate at least one of the plurality of the radar components 211 based on controlling the direction prompting unit 22 by the controller 31. For further explanation, when the direction light signal generated by the direction prompting unit 22 indicates a left turn, the control unit 24 controls one of the plurality of radar components 211 located on the left side. Similarly, when the direction light signal generated by the direction prompting unit 22 indicates a right turn, the control unit 24 controls one of the plurality of radar components 211 located on the right side.

Figure 6:
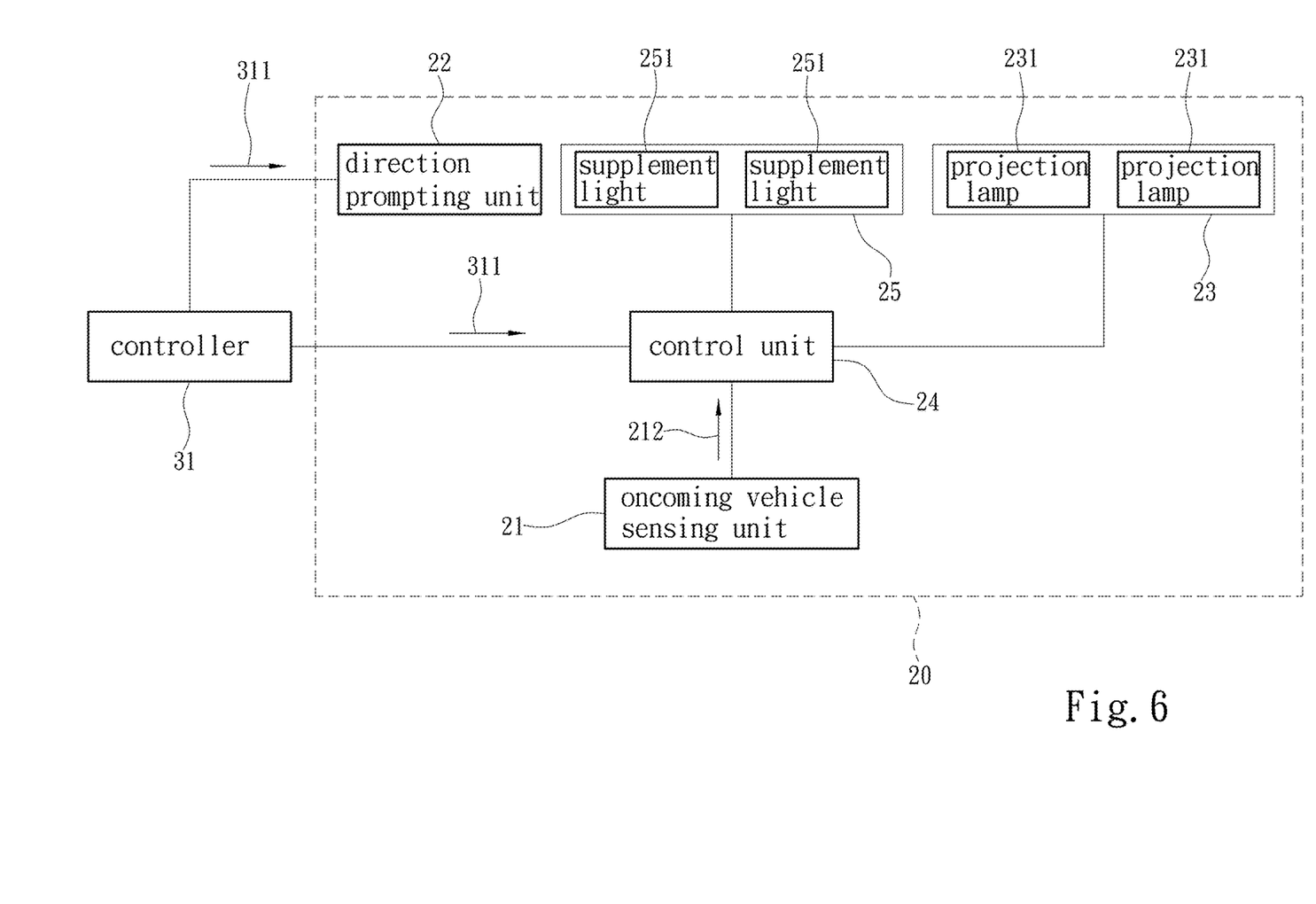
FIG. 6 is a system unit diagram (II) of an embodiment of the invention.

Please refer to FIG. 4, FIG. 5, and FIG. 6, in one embodiment, the bicycle cycling safety warning system 20 includes a front supplement light unit 25 connected to the control unit 24. In one embodiment, the front supplement light unit 25 includes two supplement lights 251 installed in front of the bicycle 30, and the two supplement lights 251 emit lights toward the left and right sides of the bicycle 30, respectively. It should be understood that the two supplement lights 251 are different from a headlight 32 of the bicycle 30. Each of the two supplement lights 251 of the front supplement light unit 25 only supplements light when the bicycle 30 turns a corner. In addition, the front supplement light unit 25 supplements light in a direction corresponding to a direction light control signal 311 transmitted by the controller 31 to the direction prompting unit 22. To be more specific, when the direction light control signal 311 indicates a right turn, one of the two supplement lights 251 on the right side is activated to supplement light. Similarly, when the direction light control signal 311 indicates a left turn, one of the two supplement lights 251 on the left side is activated to supplement light.

Figure 7:
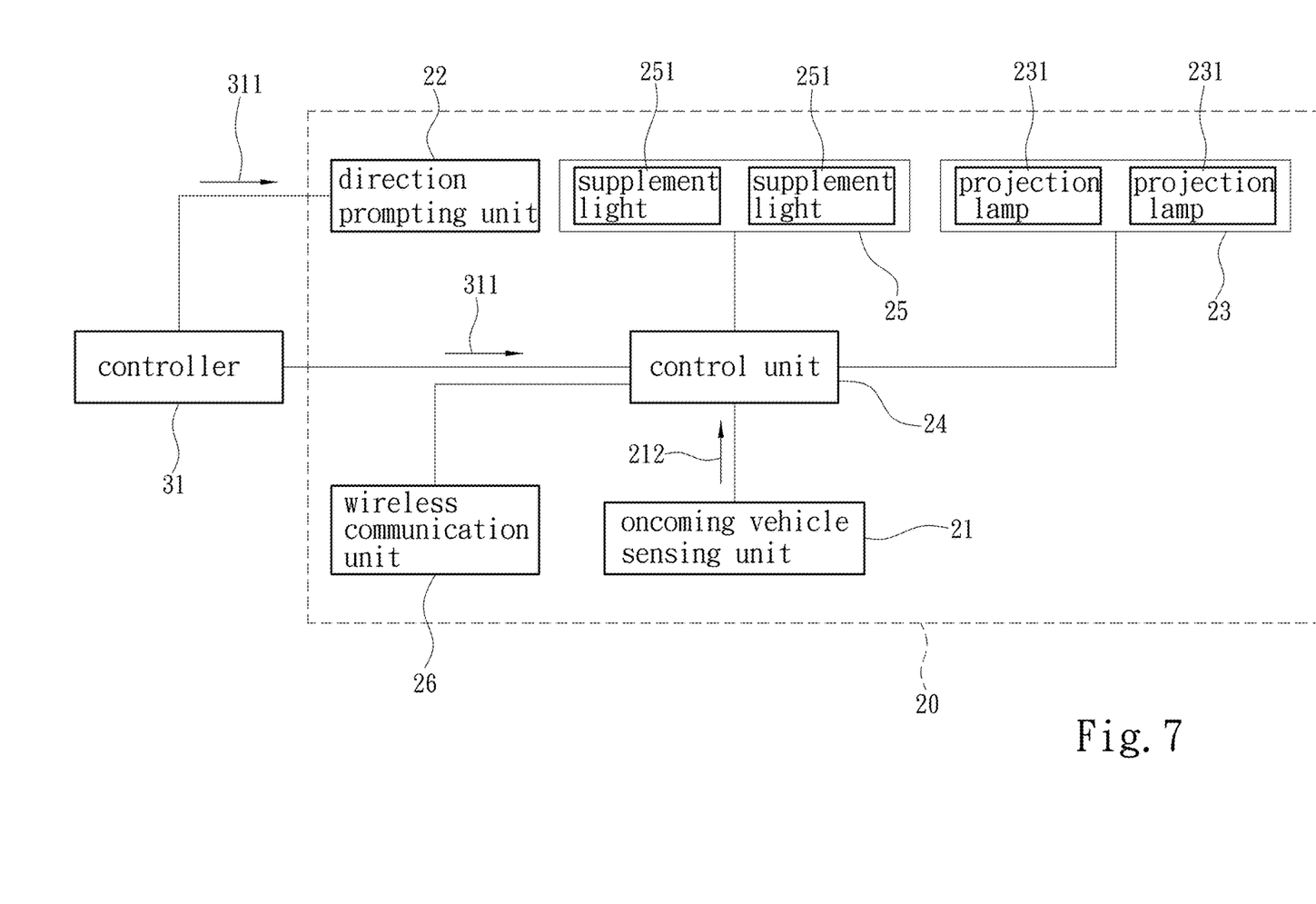
FIG. 7 is a system unit diagram (III) of an embodiment of the invention.
Figure 8:
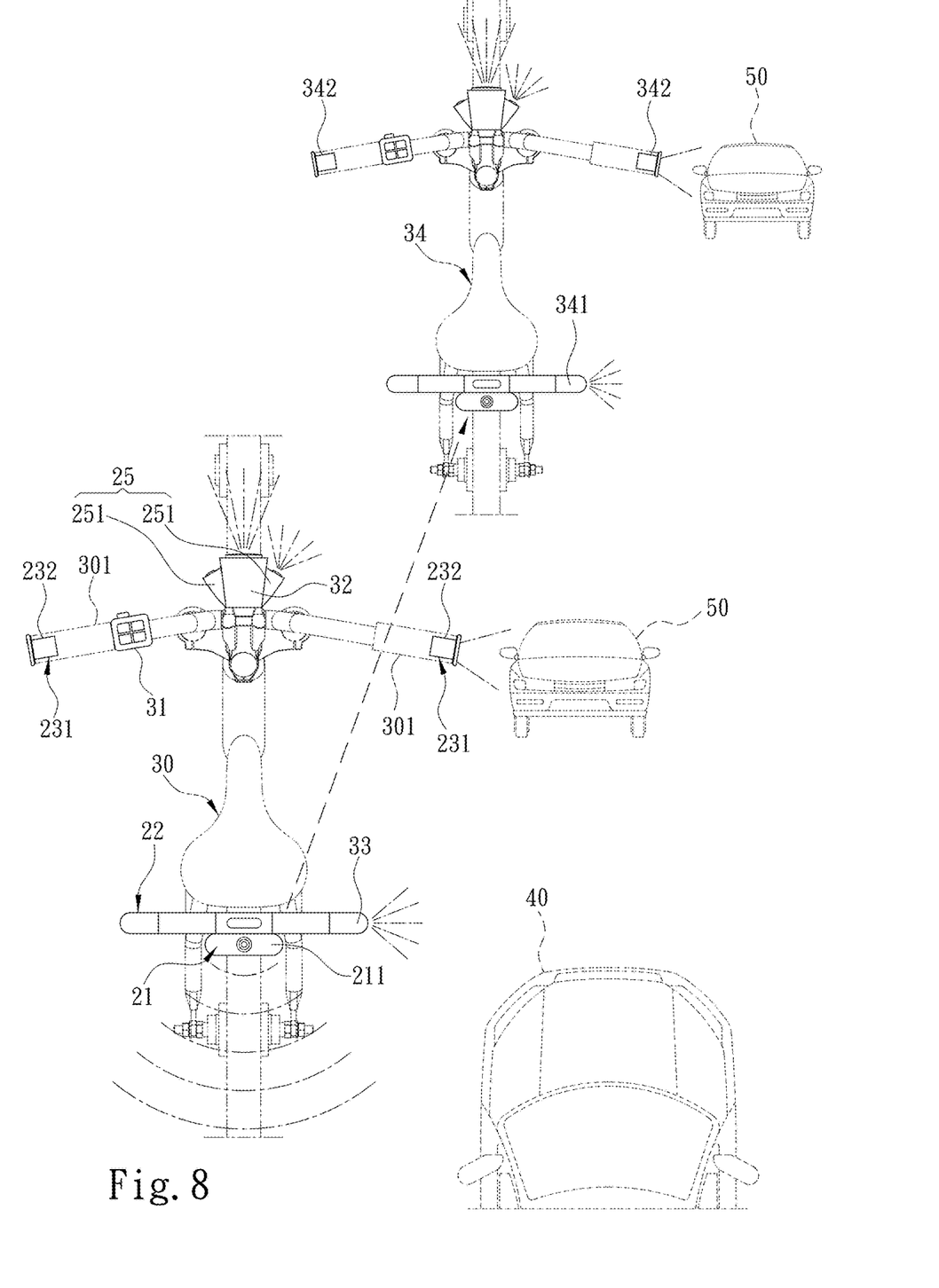
FIG. 8 is an implementation schematic diagram (V) of an embodiment of the invention.

Please refer to FIG. 7 and FIG. 8, in one embodiment, the bicycle cycling safety warning system 20 includes a wireless communication unit 26 connected to the control unit 24. The bicycle cycling safety warning system 20 is linked to at least one light device on the other bicycle 34 with the wireless communication unit 26 to increase a safety of a bicycle team. The at least one light device is a direction light 341 or a projection light 342. Further, the other bicycle 34 can also be equipped with the bicycle cycling safety warning system 20, and two bicycle cycling safety warning system 20 respectively configured on the bicycle 30 and the other bicycle 34 can be linked and implemented together.

What is claimed is:

1. A bicycle cycling safety warning system, comprising:
an oncoming vehicle sensing unit, configured on a bicycle and comprising a plurality of radar components, the oncoming vehicle sensing unit provided with an oncoming vehicle signal upon activating, and the oncoming vehicle signal comprising a positional relationship between the bicycle and an adjacent vehicle, and a speed of the adjacent vehicle;
a direction prompting unit, controlled by an independent controller, configured on the bicycle and controlled to generate a direction light signal;
a projection warning unit, comprising at least two projection lamps facing different positions, and each of the at least two projection lamps configured to generate a projection image around the bicycle when activated; and
a control unit, connected to the oncoming vehicle sensing unit, the direction prompting unit, and the projection warning unit, the control unit being in information connection to the controller for controlling the direction prompting unit to determine to activate at least one of the plurality of the radar components, the control unit operating in a first state for controlling the projection warning unit based on the oncoming vehicle signal, and a second state for controlling the projection warning unit based on the oncoming vehicle signal and the direction prompting unit, wherein the control unit determines whether the speed of the adjacent vehicle of the oncoming vehicle signal reaches a speed condition in the first state, and the control unit determines a warning mode of the projection warning unit based on the speed of the adjacent vehicle of the oncoming vehicle signal, and warning mode is one of a flicker frequency, a brightness, and an image content of the projection image,
wherein the control unit operates in the first state when the speed condition is reached to control the projection warning unit to generate the projection image, and the control unit operates in the second state based on the sensing result of the oncoming vehicle sensing unit and the operation of the direction prompt unit to control the projection warning unit to generate the projection image, and the projection image generated by the control unit in the second state is different from the projection image generated by the control unit in the first state.

2. The bicycle cycling safety warning system as claimed in claim 1, wherein the bicycle cycling safety warning system comprises a wireless communication unit connected to the control unit.

3. The bicycle cycling safety warning system as claimed in claim 1, wherein the oncoming vehicle sensing unit comprises a plurality of radar components.

4. The bicycle cycling safety warning system as claimed in claim 1, wherein the bicycle cycling safety warning system comprises a front supplement light unit connected to the control unit, and the front supplement light unit supplements light in a direction corresponding to a direction light control signal transmitted by the controller.

* * * * *